Jan. 26, 1971 A. RAVASI 3,557,411
VACUUM MIXER
Filed Jan. 31, 1968 2 Sheets-Sheet 2
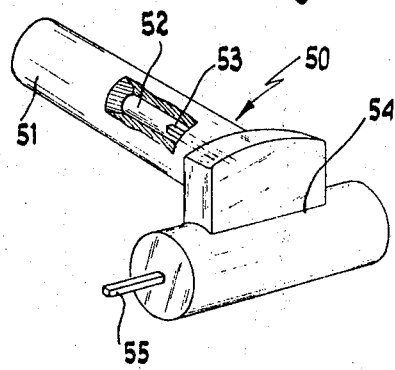
Fig. 4
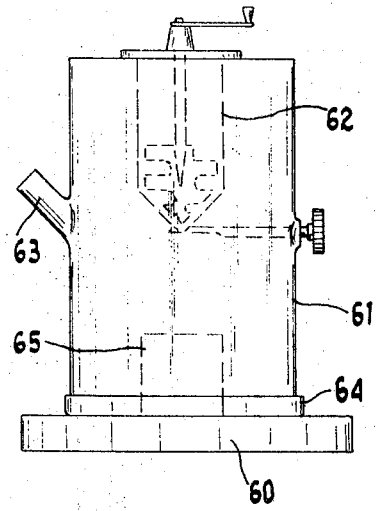
Fig. 5
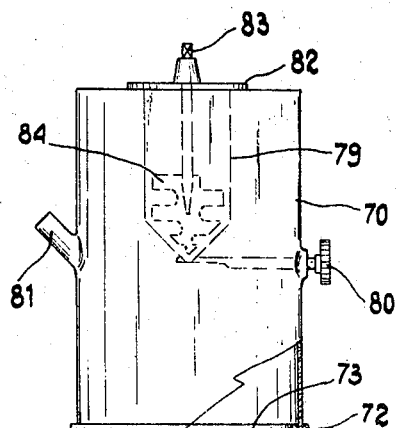
Fig. 6
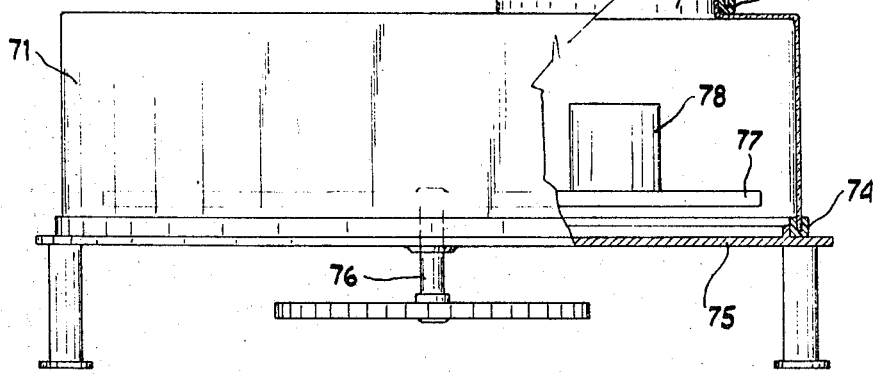
INVENTOR.
ANGELO RAVASI
BY Wenderoth, Lind & Ponack.
Attorneys

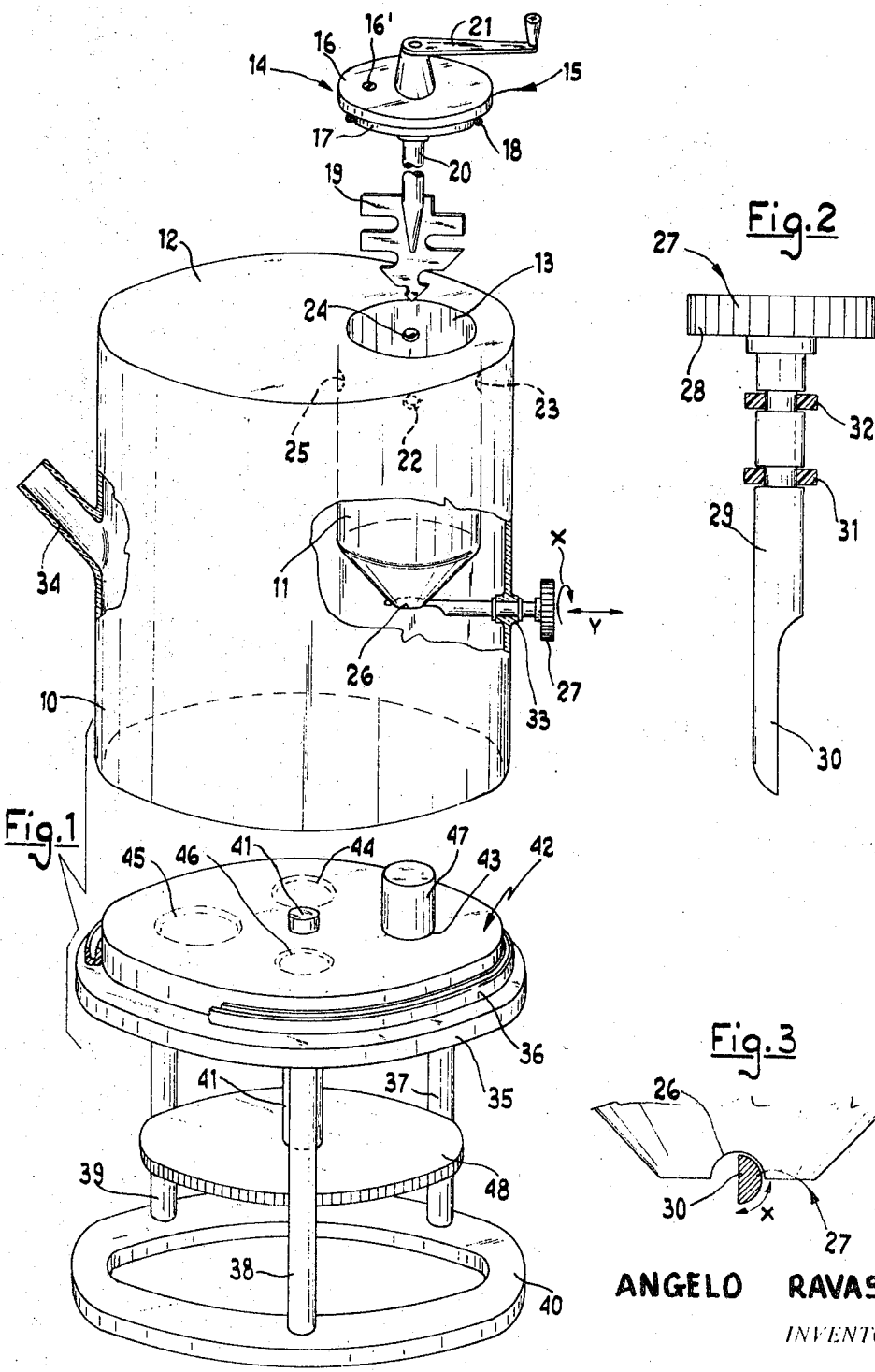

United States Patent Office 3,557,411
Patented Jan. 26, 1971

3,557,411
VACUUM MIXER
Angelo Ravasi, Olgiate Molgora, Italy, assignor to F. G.
Fina S.p.A., Milan, Italy, an Italian joint-stock company
Filed Jan. 31, 1968, Ser. No. 702,117
Claims priority, application Italy, Feb. 11, 1967,
790,653/67
Int. Cl. B28b 7/26
U.S. Cl. 25—41                                     2 Claims

ABSTRACT OF THE DISCLOSURE

A vacuum mixer designed for mixing and transferring under vacuum special pastes and gypsum for use in dental and jeweller's art and like applications, comprising a vessel wherein the paste can be manually or mechanically mixed and one or more mold containers that can be selectively driven under a vessel exhaust port. The vessel and mold containers are placed inside a jar bell, which can be connected to a vacuum source and comprises means to control from the outside the mixing and transferring operations. Advantageously, said jar bell can be joined to a vibrating device to improve the paste discharging and filling of molds.

BACKGROUND

This invention concerns a device for mixing and transferring under vacuum special pastes and gypsum for use in dental and jeweller's art and like applications, by which said materials are thoroughly mixed and the mixture is then transferred into one or more containers wherein a mold is fitted.

The operations to be performed by such mixing devices sequentially are the following: a thorough mixing of material, a transfer of resulting mixture into a container having a mold which is to be filled therewith, and a treatment of filled containers by vibrating means, to allow a more complete filling of containers and molds and a better distribution of paste therein. All the above operations are to be carried-out under vacuum, in order to prevent the molded objects from prejudiciable air inclusions, which would sharply reduce the quality thereof.

PRIOR ART

The U.S. Pat. No. 3,139,270 discloses a device consisting of a vessel made of transparent material and comprising a cup-shaped lower section, wherein the material to be mixed is contained, and a top section, acting as a cover for said vessel, and to which a vacuum duct, a shaft and relating blades for mixing operations, a mold container, consisting of a rubber cylinder, that is movably secured around an opening formed in said cover are connected. By such device, after having evacuated the vessel, the paste is mixed therein by mechanically driving means, whereafter it is transferred into mold container by capsizing it, after having detached said driving means therefrom. Finally, the filled container-mold unit is placed on a vibrating table, extending laterally from said device.

Such a device however shows many drawbacks, related both to the complexity of manual operations to be carried out, and above all to the fact that the abovestated cylindric mold container shall be tightly, but also movably secured to the vessel cover, which results in heavy difficulties when the mold containers are to be replaced with others having different sizes, and in structural complications of said mold containers, which are to be movably and tightly closed at their base not connected with said cover.

Moreover, a deformation of said cylinders may take place as consequence of thermal stresses to which they are submitted in the course of different operations, and therefore their tightness against the container cover becomes more and more uncertain in the long run, which unavoidably results in air seepages, whereby the quality of the product is negatively influenced.

The U.S. Pat. No. 3,366,369 of same applicant of the present application discloses a device for performing the above stated operations, comprising a first chamber in which the paste is mixed and a second chamber wherein the mold containers are placed, a duct by which said chambers can be placed in mutual communication whereby the paste already mixed in said first chamber can be transferred under vacuum into said second chamber and a controlled pneumatic circuit for producing a vacuum alternately in either of said chambers.

The present invention is an improvement of the latter abovestated device, which, even though allowing to usefully perform the required operations, however shows some structural complications; further, due to the fact that either chamber is always at an atmospheric pressure, some air seepages may be produced in the molded paste, resulting in a negative influence on the product quality.

SUMMARY

It is therefore an object of this invention to provide a device capable of carrying-out the required operations, under the required vacuum conditions, by means of an extremely simple and practical equipment, with which no transport of mold containers is needed, not arising any problem, neither for replacing the mold containers with others having a different size, nor for the tight closing of said containers.

Another object of the present invention is to provide a device allowing to have a plurality of mold containers filled-up in sequence, without need to reiterate same operations.

A further object of the invention is to provide a device allowing to submit the mold containers to vibrating motions in the same moment wherein the mixture is being transferred into the molds, with undeniable advantages from the viewpoint of the faultlessness of results.

To the above purposes, the present invention concerns a vacuum mixer, in particular for dental, jeweller's and similar applications, assures that coating materials, gypsum, alginates and the like will be thoroughly mixed, whereafter the resulting mixture is transferred into a container, wherein at least a single mold is placed, always under the same pressure conditions. Said mixer is characterized in that the mixing step is carried out in at least one container, fitted at a level higher than that of said mold container(s), and inside of a bell connected with a vacuum source and preferably with vibrating means, being airtight means provided for controlling from the outside both the mixing operations and the transfer of resulting mixture from said one container into each one of underlying containers.

Among the different possible embodiment forms of the invention, particularly advantageous is the one wherein said bell, made of a transparent material to allow a visual control of different operations from the outside, is shaped in such a manner as to rest movably but ensuring a positive air-tightness on at least one underlying or base plate, whereon said container(s) can be placed, and that can be mechanically connected with at least one vibrating device, in order to submit same container(s) to stated vibrating treatment. Said mixing container is advantageously located directly under the top of said bell, and is connected both pneumatically and mechanically therewith; an upper orifice, through which the materials to be mixed are charged is provided and can be closed by a cover, provided with sealing packings, as well as with manually and/or mechanically driven mixing means. The bottom of said mixer is substantially truncated-cone shaped, and is controlled by a transfer cock, consisting of a rod, that can be rotated and axially shifted from the outside to control a corresponding orifice in the bottom of said mixing container.

The further objects and advantages of the invention will be better appreciated from a consideration of the following description, taken with the accompanying drawings, being both description and drawings given only as a not restrictive example of embodiment forms of the invention.

DRAWINGS

FIG. 1 is a perspective exploded view of a first embodiment form of the invention.

FIGS. 2 and 3 respectively show structural details of the transfer controlling cock as utilized in the embodiment of FIG. 1.

FIG. 4 diagrammatically shows an attachment device by which the mixing operation, that is carried out manually in the embodiment of FIG. 1, can be mechanically performed.

FIGS. 5 and 6 respectively show in a diagrammatic form two further embodiment forms of the invention.

PREFERRED EMBODIMENTS

Referring to FIG. 1, the mixer according to the invention comprises a cylindrically shaped bell jar 10 having an apertured minor basis and made of a transparent plastic material, with a wall thickness adapted to safely withstand the stress exerted by the atmospheric pressure when a vacuum is established therein. Fitted inside of the bell top is a vessel 11 made of a transparent plastics and having a cylindrically shaped body with a truncated-cone shaped bottom. The upper end of said vessel 11 is secured to the bell top 12 and is formed with an opening 13 through which the material to be mixed may be charged, and that is then closed by the assembly 14 comprising a cover 15, consisting of two cylinders 16 and 17 having different diameters and a sealing gasket 18 fitted therebetween, and mixing means, which in the example given are manually driven. Latter means consist of the blades 19, that are driven through the shaft 20, extending across an air tight packing gland beyond the cover 15, by the crank 21 movably secured to the upper end of said shaft 20.

Formed in the upper section of the mixing vessel side wall are a plurality of orifices 22, 23, 24 and 25 through which the vessel inside is put in pneumatic communication with the bell jar inside. Said vessel comprises also a bottom opening 26 through which the transfer of the mixed paste into the underlying container(s) is made, said opening being controlled by a cock 27.

Said cock 27, as illustrated in more details in FIGS. 2 and 3, shows a substantially cylindrical and elongated shape, with a handle grip 28 for operating the same, wherefrom a cylindric stem 29 extends, having the opposite end of such stem milled in such a manner as to leave a semicircular section 30. The cylindrical portion of the rod 29 is formed with seats wherein air tight seals 31 and 32 are fitted, being said seals designed to be brought into engagement with the seat 33 formed in the bell side wall to allow the cock 27 to be brought in the operative position, as shown, in respect of the bell jar. The control of opening 26 by the cock 27 takes place by modifying the exhaust port thereof, which operation can be made both by turning said cock in the direction of arrow X and by axially shifting it in the direction of arrow Y. It is to be remarked that the structure of cock 27 is very simple, and that it can be easily removed to be cleared from deposits of material.

The bell jar 10, which can be connected with a vacuum source through pipe union 34, is removably set on the supporting plate 35, that is fitted with a packing 36 made of rubber or like material, to ensure the required air tightness of the assembly present within said bell jar. Said plate 35 is in turn rigidly connected, by means of the uprights 37, 38 and 39, to the support 40, that forms the base of the whole unit, and is adapted to be placed on the table of a vibrating device of known type (not shown).

Air-tightly connected with said plate 35, by means of the shaft 41, is a second plate 42 wherein seats 43, 44, 45 and 46 are provided to accommodate the mold containers 47, wherein the molds to be filled with the mixture are fitted. The plate 42 can be turned from the outside by means of a metal ring 48 secured to shaft 41, whereby to allow the single containers 47 to be brought, in sequence, under the orifice 26 of the vessel 11 and to be then filled with the mixture.

The operation of the abovedescribed equipment is substantially as follows:

After the mold containers 47 have been fitted into the related centering seats of plate 42, the bell jar 10 is placed onto the plate 35, in air-tight engagement with the packing 36 and, after the cock 27 has been closed, the container 11 is charged with the materials to be mixed. Then, the opening 13 is closed with the cover 14 and the bell jar is connected with a vacuum source, whereby to attain the required vacuum degree within said bell; thereafter, the support 40, together with the complete equipment having been placed—if required—on the table of a vibrating device, the different materials are thoroughly mixed. When the desired mixing degree is attained, the resulting mixture is transferred into the underlying cylinders 47, by the operation of cock 27 and metal ring 48. The whole amount of mixture present in the vessel 11 can be transferred without leaving residues, owing both to the shape of said vessel and to the action of vibrating means, as well as to particular design of cock and finally to the possibility of having the mixing action contained in the course of material transfer; in addition, an adjustable valve 16' is provided in the cover 14, thereby to establish a pressure differential between the inside of vessel 11 and the inside of bell jar 10, thereby strongly promoting the transfer operation. Thus, as it can be readily appreciated, all drawbacks inherently associated with known prior art arrangements are wholly prevented; this holds in particular as regards to the mold containers, which are held in a vacuum room and therefore do not show sealing problems.

Alternatively, the equipment of FIG. 1 can be also mechanically driven by means of a device 50, as shown in FIG. 4 that consists of a reduction gear provided with a handle 51 in which there in an axial bore 52. A Bowden cable, connected to motor means (not shown) is threaded into said axial bore and is connected with the transmission stud 53, which in turn drives the reduction gear, consisting of a worm gearing fitted within the casing 54 and having a driven shaft that can be mechanically connected with the mixer shaft 20 in FIG. 1.

A second embodiment form, as shown in FIG. 5, is designed for transferirng the mixture into a mold container only. To such a purpose, the bottom support of the equipment is simplified, since it consists only of a plate 60 whereon the bell jar 61 along with its mixing unit 62 and the air suction nozzle 63 are placed, with said bell jar being placed into engagement with the air seal 64 and with said plate 60 designed to accommodate the mold container 65 and adapted to be placed on the table of a vibrator.

Finally, the arrangement shown in FIG. 6 is particularly suitable for the operations performed by goldsmiths and the like, when large amounts of materials are to be processed, without however the need to vibrate the mold containers. In such a case, the pneumatic bell advantageously consists of two sections 70 and 71, removably connected with each other by sealing means 72, that are put in mutual communication through the opening 73. The larger diameter lower section 71 is airtightly laid, as in 74, on the sealed support 75, through which extends the shaft 76, being the plate 77, whereon the mold containers 78 are fitted, driven by latter shaft. The top of bell jar section 71 is formed with the opening 73, through which it is put in communication with the upper bell section 70, wherein the vessel 79, the cock 80 and the vacuum nozzle 81 are fitted. The top of vessel 79 is closed by the cover 82. Keyed on a shaft 83, that extends through said cover 82, are the blades 84, being the upper end of said shaft 83 connected with means (not shown) by which, in addition to rotary motion as required for the mixing operations, a substantially axial vibrating motion is also preferably imparted to said shaft, and thus to upper bell section 70; said vibrating motion is needed in the example given to assist in the complete discharge of the resulting mixture through the cock controlled opening, when said mixture is to be transferred into the mold containers.

While certain specific embodiment forms of the invention have been herein shown and described, many changes may be made therein without departing from the spirit and scope of the invention, as defined in the appended claims.

What I claim is:

1. A vacuum type mixing, dispensing and molding apparatus for mixing, dispensing, and molding under vacuum special paste-like materials, gypsum and the like by an operator as for use in the dental and jewelry art, said apparatus comprising in combination:
   (a) vessel means including a vertically arranged, generally cylindrical body having lower wall edge means defining an open bottom of said body about a central vertical axis and defining at least a major portion of a vacuum chamber having an upper portion and a lower portion, and with means for connecting the interior of said chamber with a vacuum producing means;
   (b) a separate mixing device disposed within the upper portion of said chamber, which device includes:
      (1) a mixing vessel for the paste-like material, having an open top portion, a vertical central axis, and a bottom outlet positioned for downward dispensing of materials to be intermixed therein,
      (2) a top cover with vessel sealing means,
      (3) valve means in association with said bottom outlet including a valve member to control said dispensing, said valve means including handle means disposed exteriorly of said vacuum chamber and extending interiorly in a sealed manner thereof and connected with said valve member,
      (4) rotary mixing means disposed within said mixing vessel and capable of continuous operation by suitable driving means, even during said dispensing; and
      (5) mix-driving means disposed exteriorly of said vacuum chamber but operatively connected with said rotary mixing means within said vessel;
   (c) rotable table means including a table upper surface adapted to support at least one paste-receiving mold, and disposable within the lower portion of said chamber when in operative assembly, with means for supporting said table surface for rotation about a vertical axis which is laterally offset from the downward dispensing path of mixed material when initiated by said valve means and which is coaxial within said cylindrical body;
   (d) operator controlled table-rotating means connected with said table for selectively rotating said table upper surface to a plurality of predetermined positions relative to the aforesaid dispensing path of the mixed material, whereby the paste-like intermixed material is mixed, dispensed and molded sequentially while in a reduced atmospheric pressure vacuum condition;
   (e) means connecting said mixing vessel with said cylindrical body with the vertical axis of said mixing vessel offset from that of said body;
   (f) said apparatus further including a stationary support means for supporting said body, table, and its table-rotating means, said stationary support comprising an annular member encircling said table; and
   (g) sealing means on said support for effecting airtight engagement with said rotary table and with said open bottom edge means of said body.

2. The apparatus as defined in claim 1 wherein said mixing vessel is also of generally cylindrical form having a center axis and frusto-conical bottom wall, and being vertically supported with the axes of said mixing vessel and vacuum chamber being eccentrically disposed; said rotary mixing means of paragraph (b)(4) including a rotary mixer having a vertical shaft and axis coaxially supported within said vessel, and means supporting said mixer shaft in sealed engagement with and projecting through the vessel's top cover.

References Cited

UNITED STATES PATENTS

| | | | |
|---|---|---|---|
| 3,366,369 | 1/1968 | Ravasi | 259—91X |
| 1,690,208 | 11/1928 | Ross et al. | 25—41(J) |
| 1,756,325 | 4/1930 | Williams | 164—260X |
| 1,936,857 | 11/1933 | Reisdorf | 222—152 |
| 3,185,565 | 5/1965 | Taylor | 164—256X |

CHARLES W. LANHAM, Primary Examiner

J. E. ROETHEL, Assistant Examiner

U.S. Cl. X.R.

164—257, 260; 222—152